US005233369A

United States Patent [19]

[11] Patent Number: 5,233,369

[45] Date of Patent: Aug. 3, 1993

Carlotta et al.

[54] METHOD AND APPARATUS FOR SUPPLYING INK TO AN INK JET PRINTER

[75] Inventors: Michael Carlotta, Sodus; Steven J. Dietl, Ontario; Richard A. Morano, Lyons, all of N.Y.

[73] Assignee: Xerox Corporation, Stamford, Conn.

[21] Appl. No.: 634,585

[22] Filed: Dec. 27, 1990

[51] Int. Cl.$^{5}$ .............................................. G01D 15/18

[52] U.S. Cl. ................................................ 346/140 R

[58] Field of Search ...................... 346/1.1, 140 R, 75; 222/187-189, 481; 239/326

[56] References Cited

U.S. PATENT DOCUMENTS

| | | | |
|---|---|---|---|
| 4,095,237 | 6/1978 | Amberntsson et al. | 346/140 R |
| 4,419,678 | 12/1983 | Kasugayama et al. | 346/140 R |
| 4,571,599 | 2/1986 | Rezanka | 346/140 |
| 4,714,937 | 12/1987 | Kaplinsky | 346/1 |
| 4,771,295 | 9/1988 | Baker et al. | 346/1.1 |
| 4,791,438 | 12/1988 | Hanson et al. | 346/140 |
| 4,794,409 | 12/1988 | Cowger et al. | 346/140 |
| 4,929,969 | 5/1990 | Morris | 346/140 R |
| 4,931,811 | 6/1990 | Cowger et al. | 346/140 |

FOREIGN PATENT DOCUMENTS

| | | | |
|---|---|---|---|
| 0012351 | 1/1986 | Japan | 346/140 R |

*Primary Examiner*—Benjamin R. Fuller
*Assistant Examiner*—Eric Frahm
*Attorney, Agent, or Firm*—Kenyon & Kenyon

[57] ABSTRACT

An ink cartridge for an ink jet printer that supplies ink at a negative pressure is disclosed. The cartridge includes a cartridge housing having an upper chamber and a lower chamber and a first wall therebetween. The upper chamber has an aperture exposed to atmosphere and it also contains a capillary foam having a specifiable capillarity for absorbing ink. The lower chamber is airlocked until the ink level in the upper chamber is sufficiently low to allow the passage of air through the pores. A printhead is disposed at a vertical height greater than a top level of the lower chamber. A supply line is provided which conveys ink by capillary action of the nozzles to the printhead. A second capillary foam has a specifiable capillarity greater than the capillarity of the first capillary foam. The second foam is in fluidic communication with the upper and lower chambers and with the supply line.

8 Claims, 3 Drawing Sheets

METHOD AND APPARATUS FOR SUPPLYING INK TO AN INK JET PRINTER

BACKGROUND OF THE INVENTION

The invention relates generally to ink cartridges for ink jet printing systems, and more particularly to an improved cartridge having a high ink storage capacity that also prevents the spillage of ink.

Thermal ink jet printers typically have a printhead mounted on a carriage which traverses back and forth across the width of a movable recording medium such as paper. The printhead generally includes a array of nozzles that confront the recording medium. Each nozzle is located at one end of an ink-filled channel, the other end of which is connected to an ink supply reservoir. As the ink in the vicinity of the nozzles is used, it is replaced by ink in the reservoir. Small resistors in the channels are individually addressed by current pulses that represent digitized information or video signals. The thermal energy from the resistors causes droplets to be expelled from the nozzle and propelled onto the recording medium, where each droplet prints a picture element or pixel.

It is important that the ink at the nozzle be maintained at a negative pressure (sub-atmospheric pressure) so that the ink is prevented from dripping onto the recording medium unless a droplet is expelled by thermal energy. A negative pressure also advantageously ensures that the size of the ink droplets ejected from the nozzle remain constant as ink is depleted from the reservoir. The negative pressure is usually in the range of −0.5 to −2.0 inches.

A known, very simple method of supplying the ink at a negative pressure is shown in FIG. 1. The ink in container 6 has a maximum ink supply level 2 that is 0.5 inches below the printhead 1. The bottom of the container 6 is 2.0 inches below the printhead. The ink is drawn up the ink supply tube 3 by capillary action of print head nozzles. As long as the container 6 has an aperture 4 exposed to atmospheric pressure, this configuration will supply ink to the printhead 1 through the ink supply tube 3 at a negative pressure of 0.5 to 2.0 inches. The disadvantages of this configuration are that if the cartridge is not held upright the ink will spill out of the nozzles, and that the volume of ink available to the printhead is limited by the available volume in the machine, below the printhead nozzles.

Another known method of supplying ink at a negative pressure is shown in FIG. 2. In this configuration, the chamber 6 is filled with a foam in which the ink is suspended by capillary action. The foam is generally a partially saturated, reticulated urethane foam. The absorption of the ink by the foam maintains the ink at a negative pressure at the printhead 1. The value of the negative pressure is determined by a number of factors, including the properties of the foam selected, the surface tension of the ink, the height of the foam with respect to the printhead 1, and most importantly, the saturation of the foam. If the foam is filled with ink to 100% of its capacity, the ink will behave as if the foam were not present and thus there will be no negative pressure. An inherent advantage of a partially saturated foaming design is that because the ink is absorbed by the foam, ink will not spill regardless of the orientation of the cartridge. This is particularly advantageous during the shipping of the cartridge. However, a significant disadvantage of this design is its volume inefficiency; the cartridge needs a relatively large volume to supply a given quantity of ink. For example, a cartridge of this type manufactured by the Hewlett-Packard Corporation has a volume of 45 cc which can supply only 22 cc of usable ink. Thus, this cartridge has an efficiency of less than 50%.

Given the problems associated with these ink delivery systems, there is a need for an ink jet cartridge that has an improved volume efficiency while additionally minimizing the likelihood of spillage.

SUMMARY OF THE INVENTION

The invention relates to an ink cartridge for an ink jet printer that overcomes the deficiencies noted above. The cartridge includes a cartridge housing having an upper chamber, a lower chamber and a first wall therebetween. The upper chamber contains a capillary foam substantially throughout having a specifiable capillarity for absorbing ink. An aperture in the chamber wall exposes the foam to atmosphere. The lower chamber is substantially filled with ink. A printhead is disposed at a vertical height greater than a top level of the lower chamber. A supply line is provided which conveys ink by capillary action from the chambers to the printhead. A second capillary foam has a specifiable capillarity greater than the capillarity of the first capillary foam. The second foam is in fluidic communication with the upper and lower chambers and with the supply line. The high saturation of the substantially submerged second foam prevents air from entering the lower chamber.

By providing two ink chambers, one containing foam and one not, the cartridge as a whole provides a relatively high ink storage capability in a small volume. Additionally, the cartridge advantageously prevents the spillage of ink regardless of its orientation. If the second foam is completely saturated, the lower ink-filled chamber is air-locked and thus ink cannot spill out therefrom. If the second foam is slightly desaturated, as might occur when the cartridge is tilted, the ink within the second foam will be at a negative pressure sufficient to support the ink in the supply line so that ink will not spill from the printhead. Therefore, regardless or orientation of the cartridge or the degree of saturation of the second foam, ink cannot be spilled.

In an alternative embodiment of the invention, only one chamber is provided, which corresponds to the lower chamber in the first embodiment. Since no saturated-foam ink source is provided, this cartridge maximizes volume efficiency similar to that of the known cartridge depicted in FIG. 1. However, unlike the cartridge in FIG. 1, this embodiment advantageously prevents the spillage of ink because a high capillarity foam tightly abuts the intake of the supply line. An aperture exposes the chamber to atmosphere. Similar to the second foam in the first embodiment, this high capillarity foam also prevents spillage regardless of the orientation of the cartridge.

The above is a brief description of some of the deficiencies in disclqsed ink jet cartridges and the advantages of the present invention. Other features, advantages, and embodiments of the invention will be apparent to those skilled in the art from the following description, accompanying drawings and appended claims.

DETAILED DESCRIPTION

Figure 3:
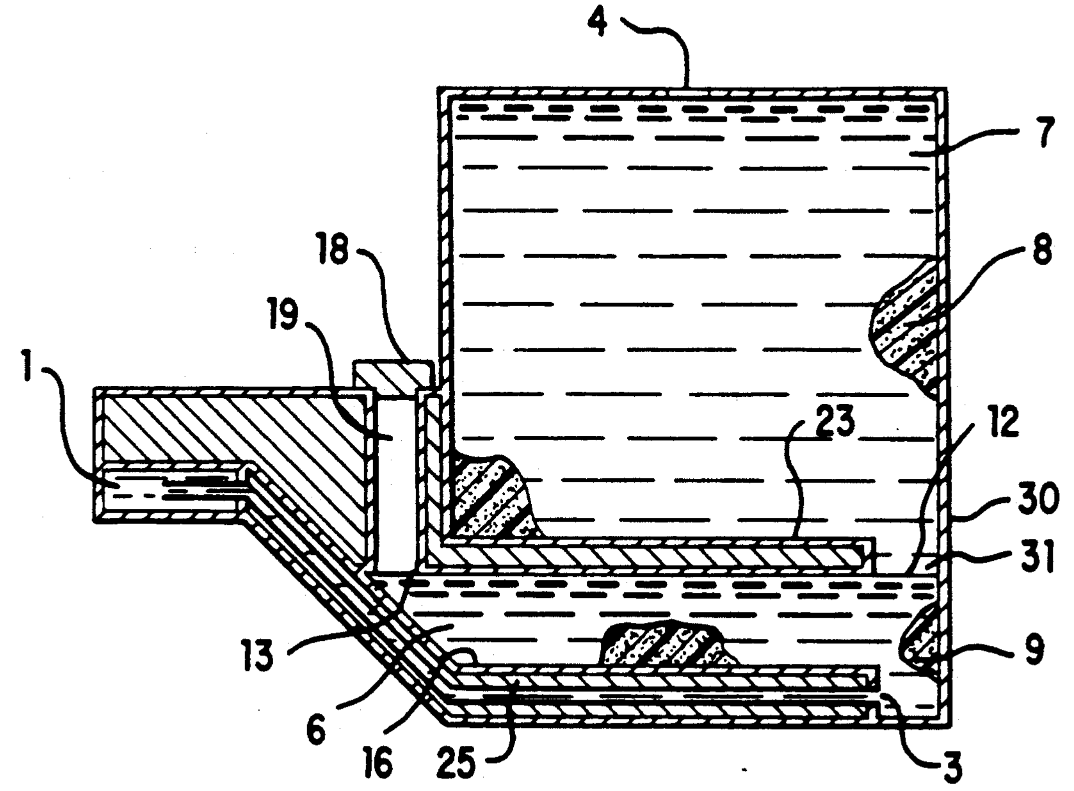
FIG. 3 shows an elevational cross-sectional view of an ink jet cartridge constructed according to the principles of the invention.

FIG. 3 shows a first embodiment of the ink jet cartridge of the present invention in an elevational cross-sectional view. The cartridge includes an upper chamber 7 that is substantially filled with a capillary foam 8 such as a felted reticulated polyurethane foam. This foam 8 is compressed against walls of chamber 7. The chamber has an aperture 4 that exposes the foam 8 in the upper chamber 7 to atmospheric pressure.

The foam used in the upper chamber can be a melamine foam, a fiber mass, or any material that provides the requisite capillary action. In this instance it should provide a pressure of between-1 inch of water to-6 inches of water.

A lower chamber 6 is provided which is initially substantially filled with ink. A first wall 23 forms both the bottom of the upper chamber 7 and the top of the lower chamber 6. The first wall 23 extends horizontally between the two chambers 6 and 7, but is spaced apart from the vertical wall 30 of the cartridge to form an opening 31 connecting the two chambers 6 and 7. The chamber 6 is positioned so that its top level 13 is situated below the level of the printhead 1. In FIG. 3, the top level 13 of the chamber 6 is positioned 0.5 inches below the printhead 1. The bottom 16 of the lower chamber 6 may be advantageously positioned so that it is 2.0 inches below the printhead 1. The lower chamber is filled during assembly through a fill conduit 19 and then hermetically sealed with a fill plug 18.

With this configuration, upper chamber 7 is isolated from surrounding atmosphere except for aperture 4 and the opening 31 to the lower chamber. Thus the pressure in this chamber is controlled by the pressure differential between aperture 4 and opening 31.

As with the upper chamber, the foam of the lower can be felted reticulated polyurethane, melamine foam or polyvinyl sponge, porous sintered plastic or any material with the requisite capillary. The foam 9 should at 100% or near 100% saturation hold a column of 10 to 15 inches of water without permitting air to pass through.

High capillary foam 9, having the characteristics described above, is disposed within opening 31 between the end of the first wall 23 and the vertical wall 30 so that it is tightly positioned against the foam 8, the lower chamber 6 and ink supply line 3. Foam 9 also abuts the first wall 23 to form seal 12 between the two chambers. As a result the second foam acts as a scavenger of ink from the foam in the upper chamber. The second foam constantly maintains itself at 100% saturation as it replenishes itself with ink from the upper foam as ink is drawn out during printing. In other words, ink cannot leave chamber 6 because the ink plug 18, and the high saturation of both foams 8 and 9, prevent air from entering the chamber 6 to take the place of escaping ink.

An ink supply line 3 transfers the ink by capillary action from the bottom portion of the foam 9 to the printhead 1. A second wall 25 is located between the bottom 16 of the chamber 6 and the ink flow line 3. The high capillary foam 9, which has a higher capillarity than the foam 8, functions as a fluid conductor that communicates ink from the upper and lower chambers 7 and 6 to the ink supply line 3. Because the capillarity of foam 9 is higher than the capillarity of foam 8 and is hence a better absorber of ink, foam 9 will remain 100% saturated with ink as long as there is ink present in the foam 8 or chamber 6. The foam 9 may comprise a poly vinyl alcohol foam.

The operation of the cartridge shown in FIG. 3 is as follows. The foam 8 is filled with ink to a saturation of less than 100% so that it provides a negative pressure. More particularly, the foam is filled with ink to approximately 60% of its capacity. Additionally, the chamber 6 is filled with ink up to its top level 13. The ink fill plug 18 is placed over the fill hole 19, hermetically sealing both the conduit 19 and the chamber 6. The ink in both chambers 6 and 7 is at a negative pressure with respect to the printhead 1. In chamber 7, the ink is at a negative pressure because it has been absorbed by the foam 8. In chamber 6, the ink is at a negative pressure because it is positioned below the level of the printhead 1.

Since the high capillary foam 9 has a higher capillarity than foam 8, foam 9 quickly becomes saturated with ink. However, the ink in the lower chamber 6 cannot be conducted through the foam 9 because, as explained above, the ink in chamber 6 is air-locked. Initially, therefore, foam 9 is only saturated with ink from the upper chamber 7. Next, the ink now in the foam 9 is conducted through the ink flow line 3 by capillary action of print head nozzles to the printhead 1 where it remains at a negative pressure until a droplet is expelled by thermal energy.

When a droplet is expelled from the printhead 1, capillary action draws an equivalent quantity of ink from the foam 9 into the ink flow line 3. In turn, ink from the foam 8 flows into the foam 9 to maintain the foam 9 at 100% saturation. As the foam 8 is drained of ink, air flows through the aperture 4 to take its place. This process continues until the foam 8 is emptied of ink and is filled with air.

As the foam 8 gradually fills with air, some of this air enters the foam 9 and breaks the airtight seal 12 between the first wall 23 and the foam 9. As a result, air will be able to enter the chamber 6 and the ink therein will no longer be air-locked. Consequently, ink now begins to flow from the chamber 6 into the foam 9. This ink supply from chamber 6 maintains the foam 9 at 100% saturation even after the foam 8 has been emptied. The foam 9 will remain completely saturated until chamber 6 has been fully drained of ink.

Figure 1:
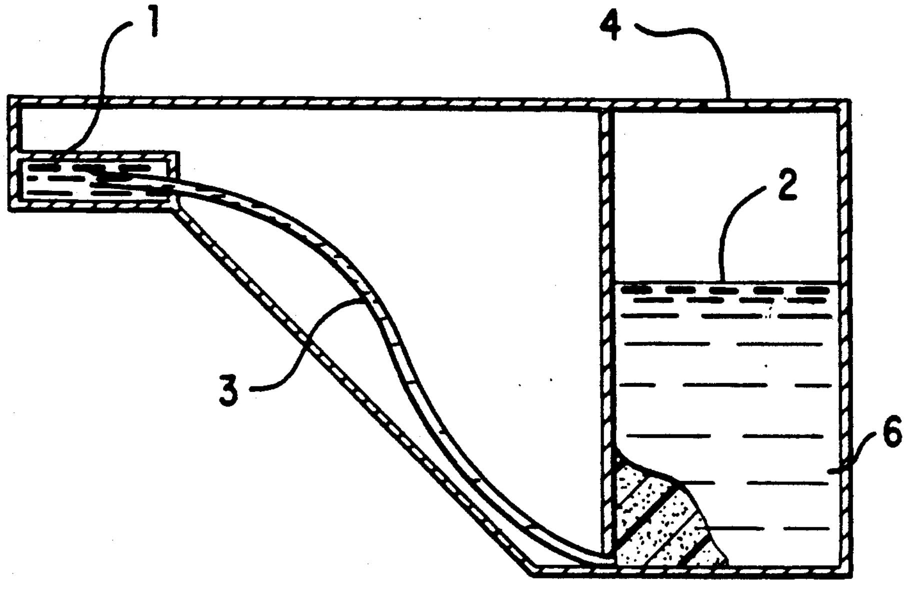
FIG. 1 shows an elevational cross-sectional view of a known ink cartridge supplying ink at a negative pressure.
Figure 2:
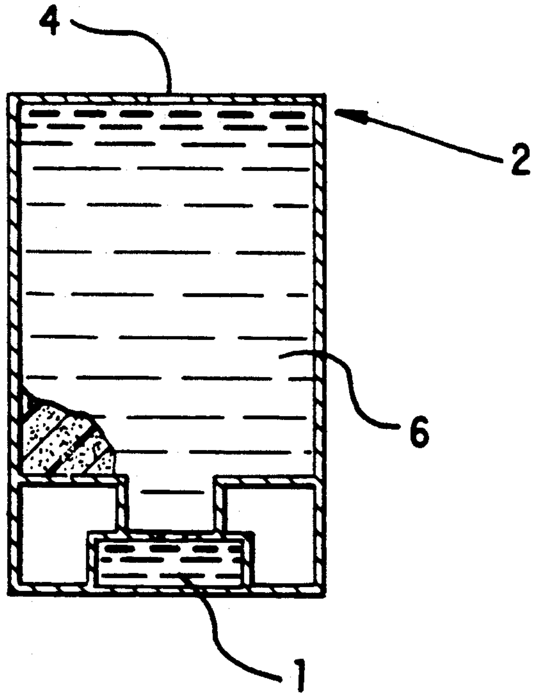
FIG. 2 shows an elevational cross-sectional view of another known ink cartridge supplying ink at a negative pressure that utilizes a foam saturated with ink.

The ink jet cartridge of the present invention provides a number of advantages over the known cartridges depicted in FIGS. 1 and 2. First, because a relatively volume-inefficient, foam-filled chamber 7 is combined with a highly volume-efficient, ink-filled chamber 6, the overall volume efficiency of the cartridge is greater than the known cartridge shown in FIG. 2.

Additionally, unlike the known cartridge depicted in FIG. 1, the cartridge of the present invention advantageously prevents the spillage of ink regardless of its orientation. As long as the foam 9 is saturated the lower chamber 6 is air-locked and thus no ink can spill out therefrom. Even if the cartridge is tipped so that printhead 1 is positioned below the remainder of the cartridge (a 90 counter-clockwise rotation of FIG. 3), ink will not spill out because gravity draws the ink in chambers 6 and 7 away from the foam 9. As a result, foam 9 becomes slightly desaturated and thus the ink therein is at a negative pressure because of capillary action. This negative pressure is sufficient to support the ink in the supply line 3 so that it will not spill from the printhead 1.

Figure 4:
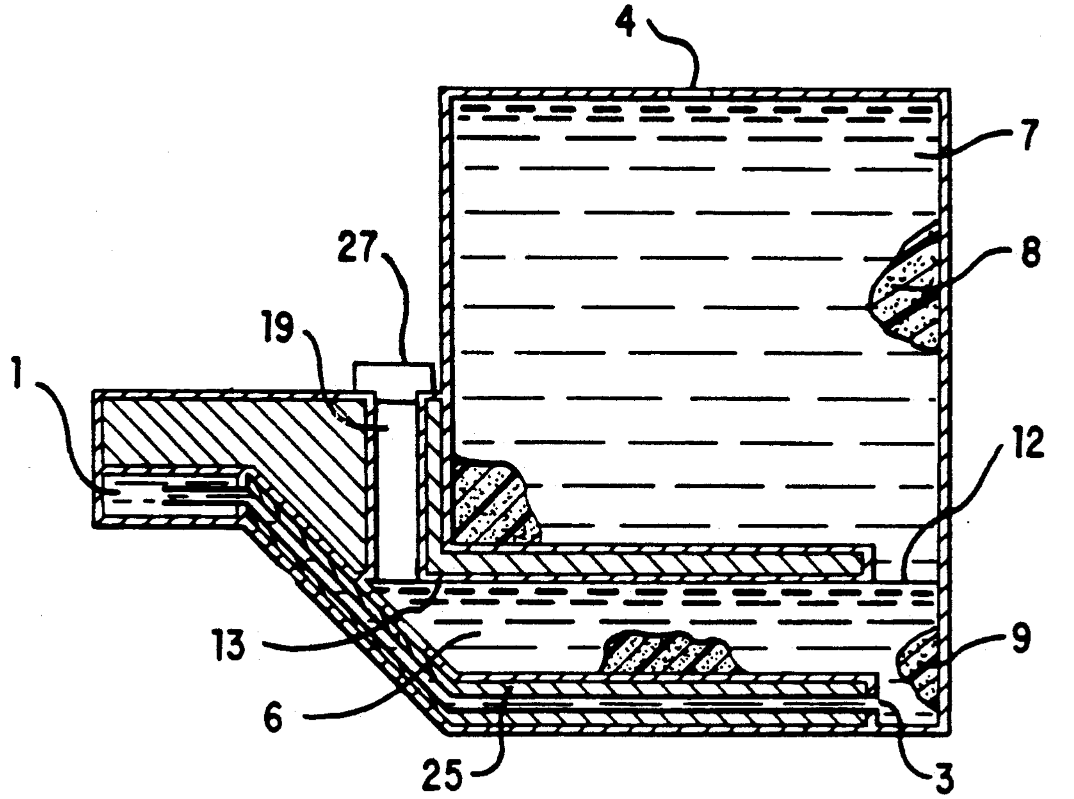
FIG. 4 shows an elevational view of an alternative embodiment of the present invention.

FIG. 4 illustrates an alternative embodiment of the invention. Like reference numerals are used for the components in FIG. 4 that correspond to those in FIG. 3. This embodiment differs from the embodiment in FIG. 3 in that the ink plug 18 is replaced by a gortex vent 27 that continuously allows air to flow through the air conduit 19, but which is impermeable to liquids. Consequently, lower chamber 6 is never air-locked and ink can be absorbed by the foam 9 at all times with the intake of air through the gortex vent 27. In this embodiment the foam 9 will draw ink from both chambers 6 and 7 simultaneously. Whether the flow rate is faster from chamber 6 or chamber 7 will depend on a number of factors, including the relative capillarities of foams 8 and 9. The cartridge may be designed so that either chamber 6 or chamber 7 will be drained of ink first. Because the gortex vent 27 is impermeable to liquids, ink cannot spill out of the lower chamber 6 via the air conduit 13 and thus this embodiment prevents spillage as effectively as the embodiment depicted in FIG. 4.

Figure 5:
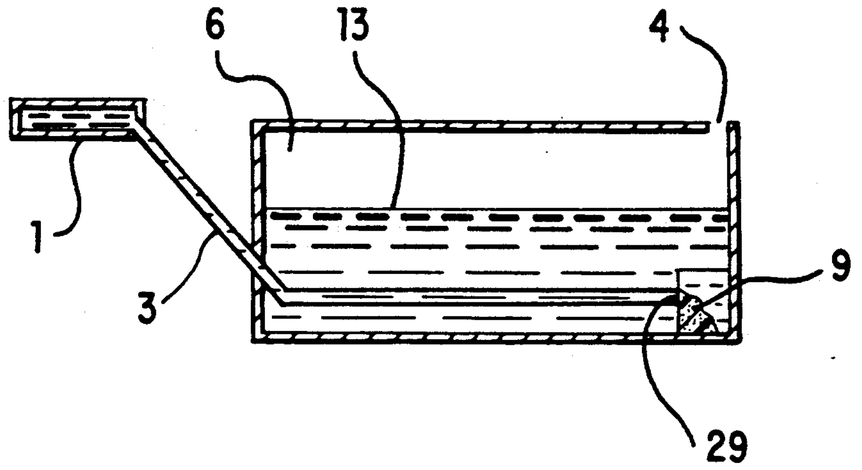
FIG. 5 shows an elevational cross-sectional view of an additional alternative embodiment of the invention.
Figure 6:
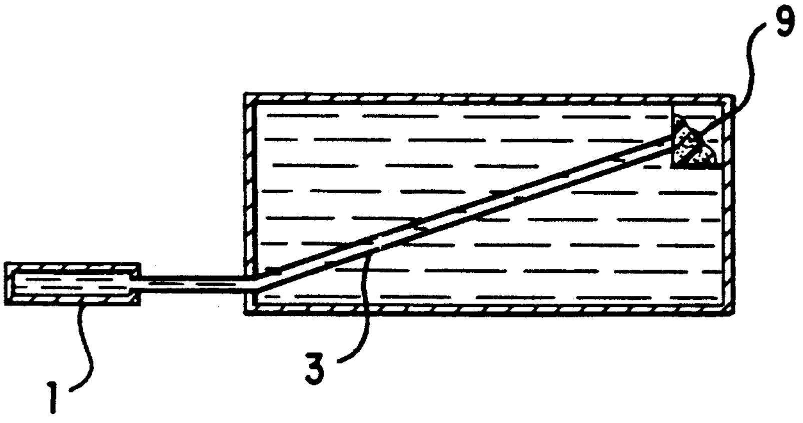
FIG. 6 shows a top view of the embodiment of the invention shown in FIG. 5.

A further embodiment of the invention is shown in FIGS. 5 and 6 and can be used in either FIG. 3 or 4 or to improve the concept in FIG. 1. Like reference numerals are used for the components in FIGS. 5 and 6 that correspond to those in the previous Figures. In this embodiment the only ink source is the lower chamber 6. Since there is no saturated-foam ink source, this cartridge maximizes volume efficiency. However, unlike the cartridge shown in FIG. 1, this embodiment advantageously prevents spillage. The high capillarity foam 9 tightly abuts the intake 29 of the ink supply line 3, which is positioned directly below the aperture 4. If the cartridge is tipped so that the printhead 1 is positioned below the rest of the cartridge, gravity will draw the ink away from the foam 9, which will become slightly desaturated. Since the foam 9 is desaturated, the ink remaining therein will be at a negative pressure sufficient to support the ink in the supply line 3 so that it will not spill out of the printhead 1.

The above is a detailed description of a particular embodiment of the invention. The full scope of the invention is set out in the claims that follow and their equivalents. Accordingly, the claims and specification should not be construed to unduly narrow the full scope of protection to which the invention is entitled.

What is claimed is:

1. A method of supplying ink to an ink jet printer comprising the steps of:
supplying ink to a first chamber of a cartridge at a negative pressure relative to a printhead;
supplying ink to a second chamber of the cartridge at a negative pressure relative to the printhead;
conducting the ink from the first and second chambers a fluidic conductor at a negative pressure greater than the negative pressures in the first and second chambers;
conducting the ink from the fluidic conductor to a supply line by capillary action; and
conducting the ink from the supply line to the printhead.

2. The method of claim 1 further comprising the step of substantially filling the first chamber with a first porous member.

3. The method of claim 2 wherein the step of conducting the ink to a fluidic conductor comprises the step of conducting the ink to a fluidic conductor having a second porous member which has a capillarity greater than the first porous member.

4. The method of claim 3 wherein said second porous member contacts the supply line.

5. A method of supplying ink to an ink jet printer comprising the steps of:
supplying ink to a first chamber of a cartridge at a negative pressure relative to a printhead;
supplying ink to a second chamber of the cartridge at a negative pressure relative to the printhead;
conducting the ink from the first chamber to a fluidic conductor having a porous member at a negative pressure greater than the negative pressures in the first and second chambers;
preventing air from entering the second chamber by maintaining the porous member at substantially 100% saturation until the first chamber is drained of a predetermined quantity of ink;
conducting the ink from the fluidic conductor to a supply line by capillary action; and
conducting the ink from the supply line to the printhead; and
maintaining the porous member at substantially 100% saturation after the first chamber is substantially depleted of ink by conducting ink from the second chamber to the porous member.

6. The method of claim 5 further comprising the step of substantially filling the first chamber with a second porous member having a capillary less than the porous member of the fluidic conductor.

7. The method of claim 6 wherein said porous member of the fluidic conductor contacts the supply line.

8. A method of supplying ink to an ink jet printer comprising the steps of:
supplying ink to a first chamber of a cartridge at a negative pressure relative to a printhead;
supplying ink to a second chamber of the cartridge at a negative pressure relative to the printhead;
conducting the ink from the first chamber to a fluidic conductor having a porous member at a negative pressure greater than the negative pressures in the first and second chambers;
preventing air from entering the second chamber by maintaining the porous member at substantially 100% saturation until the first chamber is drained of a predetermined quantity of ink;
conducting the ink from the fluidic conductor to a supply line by capillary action; and
conducting the ink from the supply line to the printhead, wherein said porous member of the fluidic conductor contacts the supply line.

* * * * *

UNITED STATES PATENT AND TRADEMARK OFFICE

CERTIFICATE OF CORRECTION

PATENT NO. : 5,233,369

DATED : Aug. 3, 1993

INVENTOR(S) : Michael Carlotta, et al

It is certified that error appears in the above-indentified patent and that said Letters Patent is hereby corrected as shown below:

| Column | Line | |
|---|---|---|
| 1 | 13 | Change "a" to --an--. |
| 2 | 45 | Change "or" to --of--. |
| 3 | 32 | Change "between-1" to --between 1--; change "to-6" to --to 6--. |
| 3 | 57 | Change "capillary" to --capillarity--. |
| 3 | 61 | Change "capillary" to --capillarity--. |
| 4 | 11 | Change "capillary" to --capillarity--. |
| 4 | 18 | Change "poly" to -- poly- --. |
| 5 | 4 | After "saturated" insert --,--. |

UNITED STATES PATENT AND TRADEMARK OFFICE

CERTIFICATE OF CORRECTION

PATENT NO. : 5,233,369

DATED : Aug. 3, 1993

INVENTOR(S) : Michael Carlotta, et al

It is certified that error appears in the above-indentified patent and that said Letters Patent is hereby corrected as shown below:

| Column | Line | |
|---|---|---|
| 5 | 21 | Change "gortex" to --gore-tex™--. |
| 5 | 26 | Change "gortex" to --gore-tex™--. |
| 5 | 33 | Change "gortex" to --gore-tex™--. |
| 6 | 4 | After "bers" insert --to-- |
| 6 | 45 | Change "capillary" to --capillarity--. |

Signed and Sealed this

Twenty-fourth Day of May, 1994

Attest:

Bruce Lehman

BRUCE LEHMAN

*Attesting Officer* *Commissioner of Patents and Trademarks*